(12) United States Patent
Makino et al.

(10) Patent No.: US 9,784,197 B2
(45) Date of Patent: Oct. 10, 2017

(54) INTERNAL COMBUSTION ENGINE CONTROL APPARATUS

(71) Applicant: Mitsubishi Electric Corporation, Tokyo (JP)

(72) Inventors: Tomokazu Makino, Chiyoda-ku (JP); Hideki Hagari, Chiyoda-ku (JP); Takuo Watanuki, Chiyoda-ku (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 487 days.

(21) Appl. No.: 13/916,137

(22) Filed: Jun. 12, 2013

(65) Prior Publication Data

US 2014/0261344 A1 Sep. 18, 2014

(30) Foreign Application Priority Data

Mar. 18, 2013 (JP) ................... 2013-054631

(51) Int. Cl.

| | |
|---|---|
| *F02D 41/00* | (2006.01) |
| *F02D 41/14* | (2006.01) |
| *F02D 41/18* | (2006.01) |
| *F02D 21/08* | (2006.01) |
| *F02D 41/24* | (2006.01) |
| *F02D 13/02* | (2006.01) |
| *F02M 26/48* | (2016.01) |

(52) U.S. Cl.
CPC ......... *F02D 41/0072* (2013.01); *F02D 21/08* (2013.01); *F02D 41/1446* (2013.01); *F02D 41/18* (2013.01); *F02D 41/2464* (2013.01); *F02D 13/0215* (2013.01); *F02D 41/2448* (2013.01); *F02D 2200/0406* (2013.01); *F02D 2200/0411* (2013.01); *F02M 26/48* (2016.02); *Y02T 10/47* (2013.01)

(58) Field of Classification Search
CPC .. F02D 41/0072; F02D 21/08; F02D 41/0065; F02D 41/0077; F02D 41/005; F02M 26/05; F02M 26/10; F02M 26/49; F02M 26/47; F02M 26/48; F02M 26/13; F02M 26/06; F02M 2026/003; F02M 26/16; F02M 26/21
USPC ..................... 123/568.26; 701/108
See application file for complete search history.

(56) References Cited

U.S. PATENT DOCUMENTS

| | | | | |
|---|---|---|---|---|
| 6,247,311 | B1 * | 6/2001 | Itoyama | F02B 37/24 60/602 |
| 7,305,967 | B1 * | 12/2007 | Hagari | F02D 9/02 123/403 |

(Continued)

FOREIGN PATENT DOCUMENTS

JP 07-279774 A 10/1995

*Primary Examiner* — Sizo Vilakazi
(74) *Attorney, Agent, or Firm* — Sughrue Mion, PLLC; Richard C. Turner

(57) ABSTRACT

There is provided an internal combustion engine control apparatus having an exhaust gas recirculation amount estimation unit that learns the relationship between an exhaust gas recirculation valve opening area calculated by an exhaust gas recirculation valve opening area calculation unit and an opening degree of the exhaust gas recirculation valve and estimates an recirculation amount of exhaust gas utilized in controlling an internal combustion engine, based on the relationship between the exhaust gas recirculation valve opening area and the opening degree of the exhaust gas recirculation valve.

11 Claims, 6 Drawing Sheets

(56) References Cited

U.S. PATENT DOCUMENTS

| | | | | |
|---|---|---|---|---|
| 8,109,258 | B2* | 2/2012 | Allain | F02M 25/0702 |
| | | | | 123/568.16 |
| 8,256,546 | B2* | 9/2012 | Ando | F02P 5/1516 |
| | | | | 123/406.45 |
| 2001/0045210 | A1* | 11/2001 | Itoyama | F02B 37/24 |
| | | | | 123/568.21 |
| 2003/0051474 | A1* | 3/2003 | Shirakawa | F02B 37/22 |
| | | | | 60/602 |
| 2007/0125076 | A1* | 6/2007 | Nosaka | F01N 9/002 |
| | | | | 60/297 |
| 2007/0215126 | A1* | 9/2007 | Shiraishi | F02D 15/02 |
| | | | | 123/568.14 |
| 2008/0276916 | A1* | 11/2008 | Sekfane | F02D 41/0055 |
| | | | | 123/568.21 |
| 2010/0162707 | A1* | 7/2010 | Ando | F02P 5/1516 |
| | | | | 60/719 |
| 2012/0192833 | A1* | 8/2012 | Hagari | F02D 35/027 |
| | | | | 123/406.35 |
| 2014/0261344 | A1* | 9/2014 | Makino | F02D 41/1446 |
| | | | | 123/568.26 |

* cited by examiner

FIG. 4

|  |  | Ne | | |
|---|---|---|---|---|
|  |  | 1500 | 3000 | 4500 |
| Pb/Pa | 0.1 | 0.5 | 0.5 | 0.5 |
|  | 0.2 | 0.6 | 0.6 | 0.55 |
|  | 0.3 | 0.7 | 0.7 | 0.65 |
|  | 0.4 | 0.8 | 0.8 | 0.75 |
|  | 0.6 | 0.9 | 0.9 | 0.85 |
|  | 0.8 | 0.95 | 0.92 | 0.9 |
|  | 1 | 0.95 | 0.95 | 0.95 |

FIG. 5

|  |  | Segr |
|---|---|---|
| Est | 10% | 5 |
|  | 20% | 10 |
|  | 30% | 15 |
|  | 40% | 20 |
|  | 60% | 25 |
|  | 80% | 40 |
|  | 100% | 50 |

FIG. 6

|  |  | LEARNING VALUE |
|---|---|---|
| Est | 10% | 0.5 |
|  | 20% | 1 |
|  | 30% | 1.5 |
|  | 40% | −1 |
|  | 60% | −2 |
|  | 80% | −1 |
|  | 100% | −3 |

INTERNAL COMBUSTION ENGINE CONTROL APPARATUS

BACKGROUND OF THE INVENTION

Field of the Invention

The present invention relates to an internal combustion engine control apparatus and more particularly to an internal combustion engine control apparatus provided with an exhaust gas recirculation amount estimation apparatus fort estimating an exhaust gas recirculation amount in an internal combustion engine.

Description of the Related Art

In order to appropriately control an internal combustion engine (referred to also as an engine, hereinafter), it is important to accurately calculate a cylinder flow rate as the amount of air taken into a cylinder of the engine and to perform fuel control and ignition timing control corresponding to the cylinder flow rate. With regard to fuel control, when feedback control can be performed in such a way that, primarily, a fuel, the amount of which causes a desired air-fuel ratio for a cylinder flow rate, is injected, almost excellent controllability can be obtained; however, ignition timing control needs to be performed at an ignition advance angle which causes an maximum output (referred to as an MBT (Minimum Spark Advance for Best Torque), hereinafter) in accordance with not only the engine rotation speed and the amount of air taken into a cylinder but also other factors such as the engine temperature, whether or not a knock has occurred, the fuel property, and the exhaust gas recirculation ratio (referred to as an EGR ratio, hereinafter), which is the ratio of the exhaust gas recirculation amount (referred to as an EGR (Exhaust Gas Recirculation) amount, hereinafter) to the cylinder flow rate.

Among the foregoing factors that provide effects to the MBT, for example, the engine temperature and whether or not a knock has occurred can be detected by an engine coolant temperature sensor and a knock sensor, respectively; with regard to the fuel property, it can be determined whether the fuel is regular gasoline or high-octane gasoline, based on whether or not a knock has occurred.

Meanwhile, with regard to the EGR ratio, there are two methods, i.e., a method (referred to also as an external EGR) in which an exhaust gas recirculation valve (referred to as an EGR valve, hereinafter) is provided in an exhaust gas recirculation path (referred to as an EGR path, hereinafter) that connects an exhaust pipe with an intake pipe and the EGR amount is controlled based on the opening degree of the EGR valve and a method (referred to also as an internal EGR) in which a variable valve timing mechanism (referred to as a VVT (Variable Valve Timing mechanism), hereinafter), which makes the opening timings of an intake valve and an exhaust valve variable, is provided and depending on the opening/closing timing of the VVT, an overlap period, during which the intake valve and the exhaust valve are concurrently opened, is changed so that the amount of EGR, which is caused by remaining exhaust gas in the cylinder, is controlled; in some cases, both the methods are concurrently utilized. In the external EGR control method, the EGR ratio can approximately be calculated from the opening degree of the EGR valve, the exhaust pressure, and the air-intake pipe pressure. In the following explanation, an EGR and an EGR ratio, when simply expressed in this manner, denote an external EGR and an external EGR ratio, respectively.

In recent years, it has become common that engine control is performed utilizing, as an index, the output torque of an engine; even when the output torque is estimated, the thermal efficiency changes in accordance with the cylinder flow rate and the EGR ratio. Accordingly, in order to calculate the foregoing MBT and furthermore in order to estimate the torque and the thermal efficiency, it is required to accurately calculate the cylinder flow rate and the EGR ratio. In order to accurately obtain the EGR ratio, it is required to accurately calculate the EGR flow rate.

Patent Document 1 discloses an EGR ratio estimation apparatus that calculates the EGR flow rate and estimates the EGR ratio, based on an exhaust gas amount obtained from the opening area of an EGR valve and an exhaust gas amount obtained from an opening area command value for the EGR valve. With a simple configuration, the apparatus disclosed in Patent Document 1 can calculate an EGR flow rate, by utilizing a preliminarily provided EGR-valve opening degree vs. flow rate characteristic and the opening area of an EGR valve.

PRIOR ART REFERENCE

Patent Document

[Patent Document 1] Japanese Patent Application Laid-Open No. H7-279774

In the case of the conventional apparatus disclosed in Patent Document 1, there has been a problem that when due to change over time, the opening degree characteristic of the EGR valve changes, the preliminarily prepared flow rate characteristic and the actual flow rate characteristic differ from each other and hence the estimation accuracy is deteriorated. The opening degree vs. flow rate characteristic of an EGR valve may change depending on not only the difference in each product but also the condition of a mounted engine.

SUMMARY OF THE INVENTION

The present invention has been implemented in order to solve the foregoing problems in a conventional apparatus; the objective thereof is to provide an internal combustion engine control apparatus that can accurately estimate an EGR flow rate even when due to change over time, the opening degree vs. flow rate characteristic of an EGR valve changes.

An internal combustion engine control apparatus according to the present invention is characterized by including an intake air amount detection unit that detects an amount of air that passes through a throttle valve provided in an intake pipe of an internal combustion engine and is taken into the internal combustion engine; an exhaust gas recirculation path that connects an intake pipe at the downstream side of the throttle valve with an exhaust pipe of the internal combustion engine; an exhaust gas recirculation valve that opens or closes the exhaust gas recirculation path so as to control an recirculation amount of exhaust gas that passes through the exhaust gas recirculation path; an intake pipe pressure detection unit that detects a pressure in the intake pipe at the downstream side of the throttle valve; a volume efficiency corresponding value calculation unit that calculates a volume efficiency corresponding value as an index that indicates an amount of air that flows from the intake pipe at the downstream side of the throttle valve into a cylinder of the internal combustion engine; a cylinder flow rate calculation unit that calculates a cylinder flow rate as an amount of air that flows from the intake pipe at the downstream side of the throttle valve into the cylinder, based on the pressure in the intake pipe and the volume efficiency corresponding value; an exhaust gas recirculation amount calculation unit that calculates the recirculation amount of exhaust gas, based on an intake air amount detected by the intake pipe pressure detection unit and a cylinder flow rate calculated by the cylinder flow rate calculation unit; an exhaust gas recirculation valve opening area calculation unit that calculates an exhaust gas recirculation valve opening area corresponding to the opening degree of the exhaust gas recirculation valve, based on the recirculation amount of exhaust gas obtained by the exhaust gas recirculation amount calculation unit; and an exhaust gas recirculation amount estimation unit that learns a relationship between the exhaust gas recirculation valve opening area calculated by the exhaust gas recirculation valve opening area calculation unit and the opening degree of the exhaust gas recirculation valve and estimates an recirculation amount of exhaust gas utilized in controlling the internal combustion engine, based on the relationship between the exhaust gas recirculation valve opening area and the opening degree of the exhaust gas recirculation valve.

An internal combustion engine control apparatus according to the present invention makes it possible that even when due to deposits such as soot and the like, the flow rate characteristic changes or even when due to a change over time, the EGR valve does not work, the EGR valve opening degree vs. opening area characteristic can be learned; therefore, the result of the learning makes it possible to accurately estimate the EGR flow rate.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 4 is a volume efficiency coefficient map in an internal combustion engine control apparatus according to Embodiment 1 of the present invention;

FIG. 5 is an EGR valve opening degree vs. opening area map in an internal combustion engine control apparatus according to Embodiment 1 of the present invention;

FIG. 6 is an EGR valve opening degree vs. learning value map in an internal combustion engine control apparatus according to Embodiment 1 of the present invention;

DETAILED DESCRIPTION OF THE PREFERRED EMBODIMENTS

Embodiment 1

Figure 1:
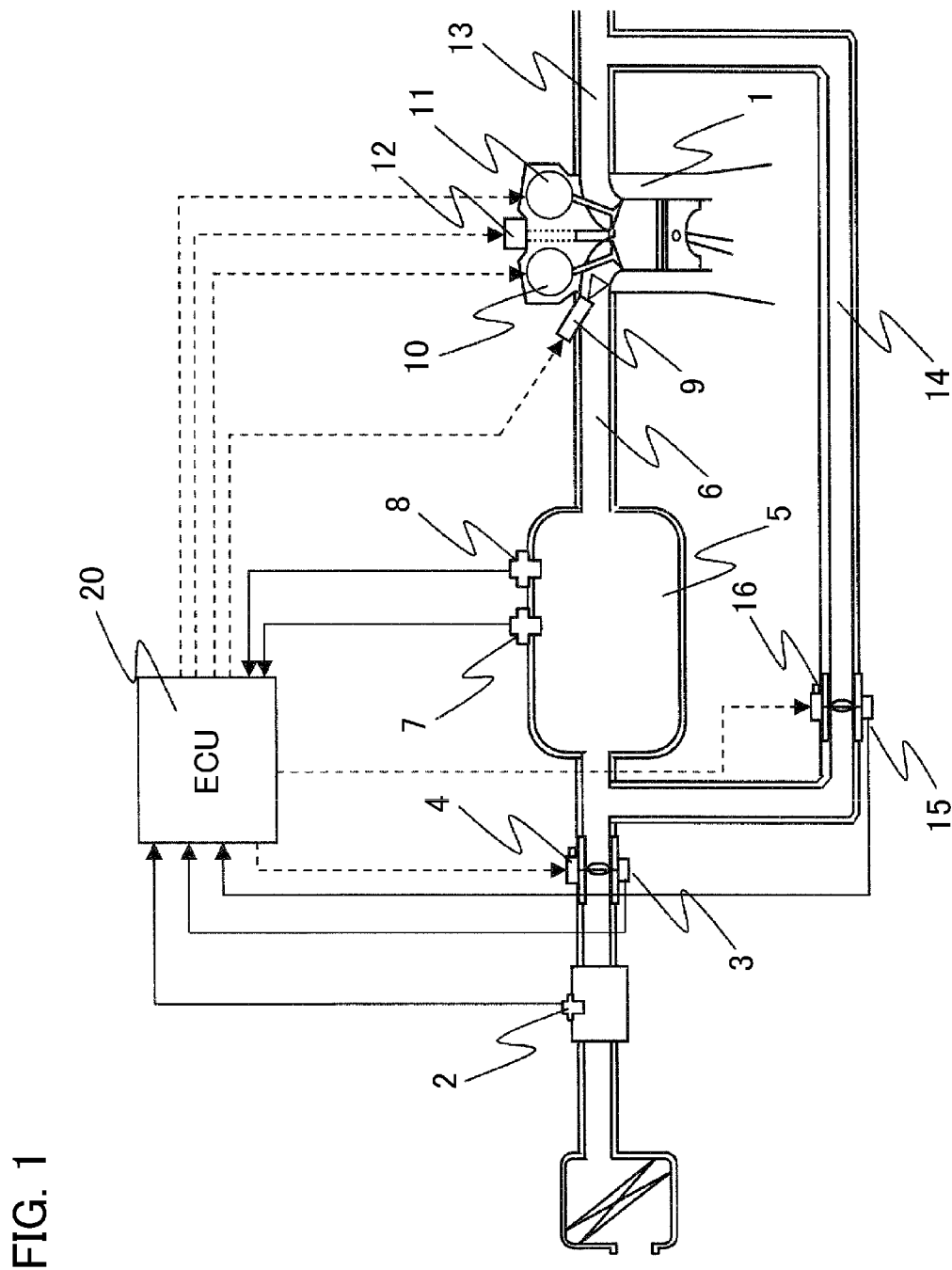
FIG. 1 is a configuration diagram schematically illustrating an internal combustion engine control system including an internal combustion engine control apparatus according to Embodiment 1 of the present invention.

Hereinafter, an internal combustion engine control apparatus according to Embodiment 1 of the present invention will be explained in detail with reference to the drawings. FIG. 1 is a configuration diagram schematically illustrating an internal combustion engine control system including an internal combustion engine control apparatus according to Embodiment 1 of the present invention. In FIG. 1, an air flow sensor (referred to as an AFS (Air Flow Sensor), hereinafter) 2, as an intake air amount detection unit, that measures the amount of intake air is provided at the upstream side of the intake system of an engine 1. At the engine 1 side, i.e., at the downstream side of the AFS 2, an electronically-controlled throttle 4 that can electrically be controlled to adjust the amount of intake air is provided.

In order to measure the opening degree of the electronically-controlled throttle valve 4, a throttle opening degree sensor 3 is provided. It may be allowed that instead of the AFS 2, another unit is utilized that measures the amount of intake air, for example, in such a manner as estimating the amount of intake air, based on the throttle valve opening degree. Furthermore, there are provided an intake manifold pressure sensor 7, as an intake pipe pressure detection unit, that measures the pressure in a space including a surge tank 5 and an intake manifold 6 provided at the downstream side of the electronically-controlled throttle 4, i.e., the intake manifold pressure; and an intake air temperature sensor 8 that measures the temperature inside the intake manifold (shortly referred to as an intake manifold temperature, hereinafter).

It may also be allowed that instead of providing the intake air temperature sensor 8 that measures an intake manifold temperature, a temperature sensor, such as a temperature sensor included in the AFS 2, that approximately measures the outer air is utilized and the intake manifold temperature is estimated from the temperature of the outer air, although strictly speaking, the estimated temperature differs from the temperature measured by use of the intake air temperature sensor 8.

An injector 9 for injecting a fuel is provided in the vicinity of the intake valve including the intake manifold 6 and the inside of the engine 1; furthermore, an intake VVT 10, as an intake valve whose valve timing is variable, and an exhaust VVT 11, as an exhaust valve whose valve timing is variable, are provided. Moreover, an ignition coil 12 for driving an ignition plug that produces a spark in a cylinder is provided on a cylinder head of the engine 1. Unillustrated catalyst and $O_2$ sensor, as an oxygen detection unit, are provided in an exhaust manifold 13.

An exhaust gas recirculation path (referred to as an EGR path, hereinafter) 14 connects an exhaust manifold 13 with the surge tank 5. An exhaust gas recirculation valve (referred to as an EGR valve, hereinafter) 16 for controlling an EGR flow rate is provided in the EGR path 14; the opening degree of the EGR valve 16 is measured by an EGR valve opening degree sensor 15, as an exhaust gas recirculation valve opening degree detection unit. In the internal combustion engine control system illustrated in FIG. 1, although not illustrated, there are provided an intake pipe side pressure detection unit for detecting an intake pipe side pressure in the EGR path 14, an exhaust pipe side temperature detection unit for detecting an exhaust pipe side temperature of the EGR path 14, an exhaust pipe side pressure detection unit for detecting an exhaust pipe side pressure in the EGR path 14, an exhaust pipe side sonic velocity calculation unit for calculating an exhaust pipe side sonic velocity based on the exhaust pipe side temperature detected by the exhaust pipe side temperature detection unit, and an exhaust pipe side density calculation unit for calculating an exhaust pipe side density based on the exhaust pipe side pressure detected by the exhaust pipe side pressure detection unit and the exhaust pipe side temperature detected by the exhaust pipe side temperature detection unit.

Figure 2:
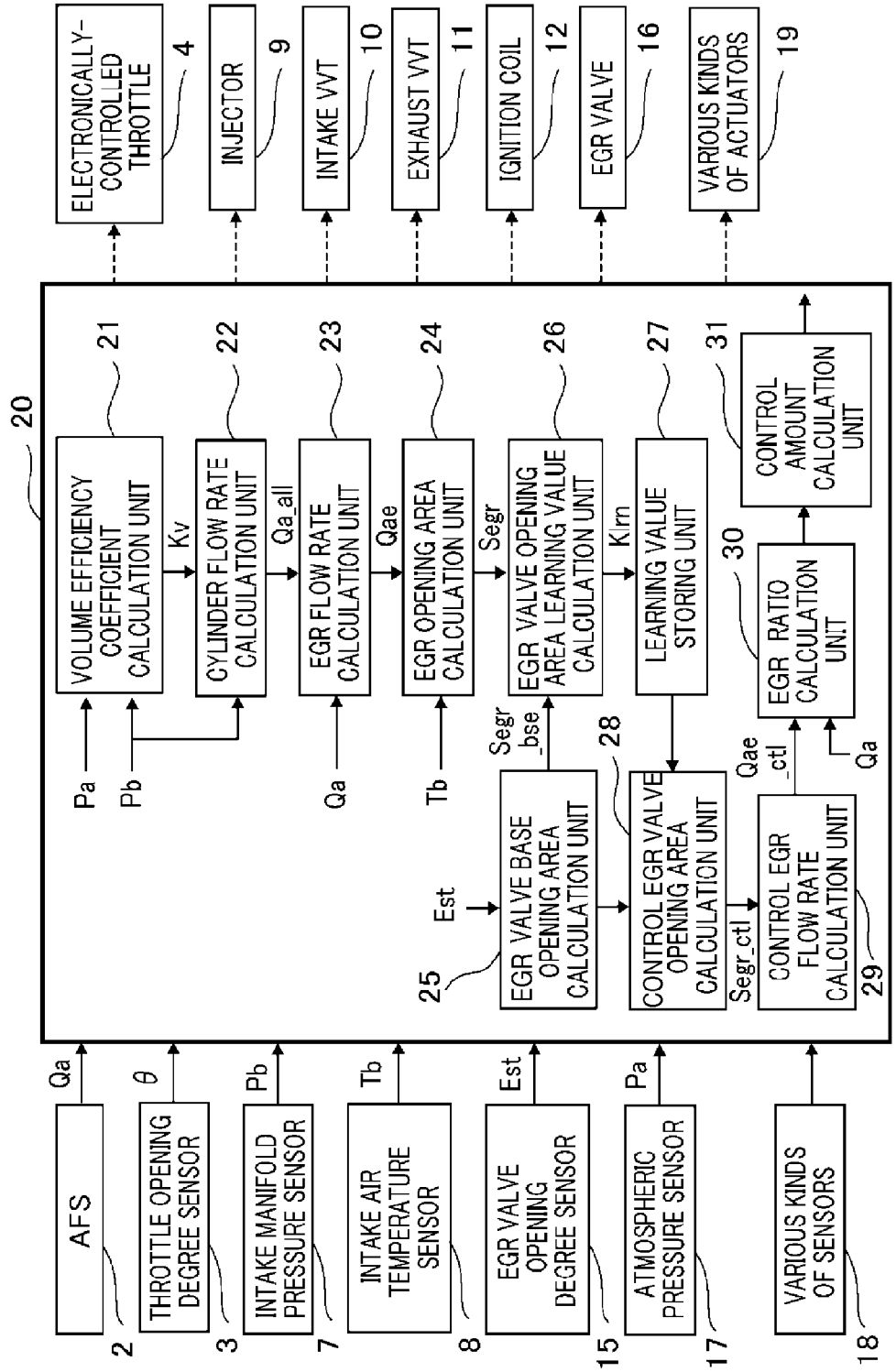
FIG. 2 is a block diagram of an internal combustion engine control apparatus according to Embodiment 1 of the present invention.

FIG. 2 is a block diagram of an internal combustion engine control apparatus according to Embodiment 1 of the present invention. In FIG. 2, an intake air amount Qa measured by the AFS 2, an opening degree θ of the electronically-controlled throttle 4 measured by the throttle opening degree sensor 3, an intake manifold pressure Pb measured by the intake manifold pressure sensor 7, an intake manifold temperature Tb measured by the intake air temperature sensor 8, an opening degree Est of the EGR valve 16 measured by the EGR valve opening degree sensor 15, and an atmospheric pressure Pa measured by an atmospheric pressure sensor 17 are inputted to an electronic control unit (referred to as an ECU (Electric Control Unit), hereinafter) 20. Instead of the atmospheric pressure sensor 17 for measuring an atmospheric pressure, either a unit for estimating an atmospheric pressure or an atmospheric pressure sensor incorporated in the ECU may be utilized. Measurement values are also inputted to the ECU 20 from various sensors 18 (including an accelerator opening degree sensor and a crank angle sensor).

The ECU 20 is provided with a volume efficiency coefficient calculation unit 21 that calculates a volume efficiency coefficient Kv, a cylinder flow rate calculation unit 22 that calculates an cylinder flow rate Qa_all by use of the volume efficiency coefficient Kv, the intake manifold pressure Pb, and the intake manifold temperature Tb, an EGR flow rate calculation unit 23 that calculates an EGR flow rate Qae by use of the cylinder flow rate Qa_all and the intake air amount Qa, an EGR valve opening area calculation unit 24 that calculates an EGR valve opening area Segr from the EGR flow rate Qae and the intake manifold temperature Tb, an EGR valve base opening area calculation unit 25 that calculates an EGR valve base opening area Segr_bse from the EGR valve opening degree Est, and an EGR valve opening area learning value calculation unit 26 that calculates an EGR valve opening area learning value Klrn by use of the EGR valve opening area Segr and the EGR valve base opening area Segr_bse. The volume efficiency coefficient calculation unit 21 corresponds to a volume efficiency corresponding value calculation unit that calculates a volume efficiency corresponding value as an index that indicates the amount of air that flows from the intake pipe at the downstream side of the throttle valve into a cylinder of the engine.

The ECU 20 is further provided with a learning value storing unit 27 that stores an EGR valve opening area learning value Klrn in accordance with the EGR valve opening degree Est, a control EGR valve opening area calculation unit 28 that calculates a control EGR valve opening area Segr_ctl from the EGR valve opening area learning value Klrn stored in the learning value storing unit 27 and the EGR valve base opening area Segr_bse, a control EGR flow rate calculation unit 29 that calculates a control EGR flow rate Qae_ctl from the control EGR valve opening area Segr_ctl, an EGR ratio calculation unit 30 that calculates an EGR ratio from the calculated Qae_ctl and the intake air amount Qa, and a control amount calculation unit 31 that calculates driving amounts for the injector 9, the ignition coil 12, and the like, based on the calculated EGR ratio.

The ECU 20 calculates a desired torque of the engine 1, based on the inputted various kinds of data items such as the accelerator opening degree and the like, and calculates a desired cylinder intake air amount for achieving the calculated desired torque. Then, the ECU 20 calculates a desired throttle valve opening degree, a desired intake VVT phase angle, and a desired exhaust VVT phase angle in such a way that the desired cylinder intake air amount is achieved, and controls the opening degree of the electronically-controlled throttle 4 and the phase angles of the intake VVT 10 and the exhaust VVT 11 with respect to these desired values. Furthermore, other various kinds of actuators 19 are also controlled, as may be necessary.

Figure 3:
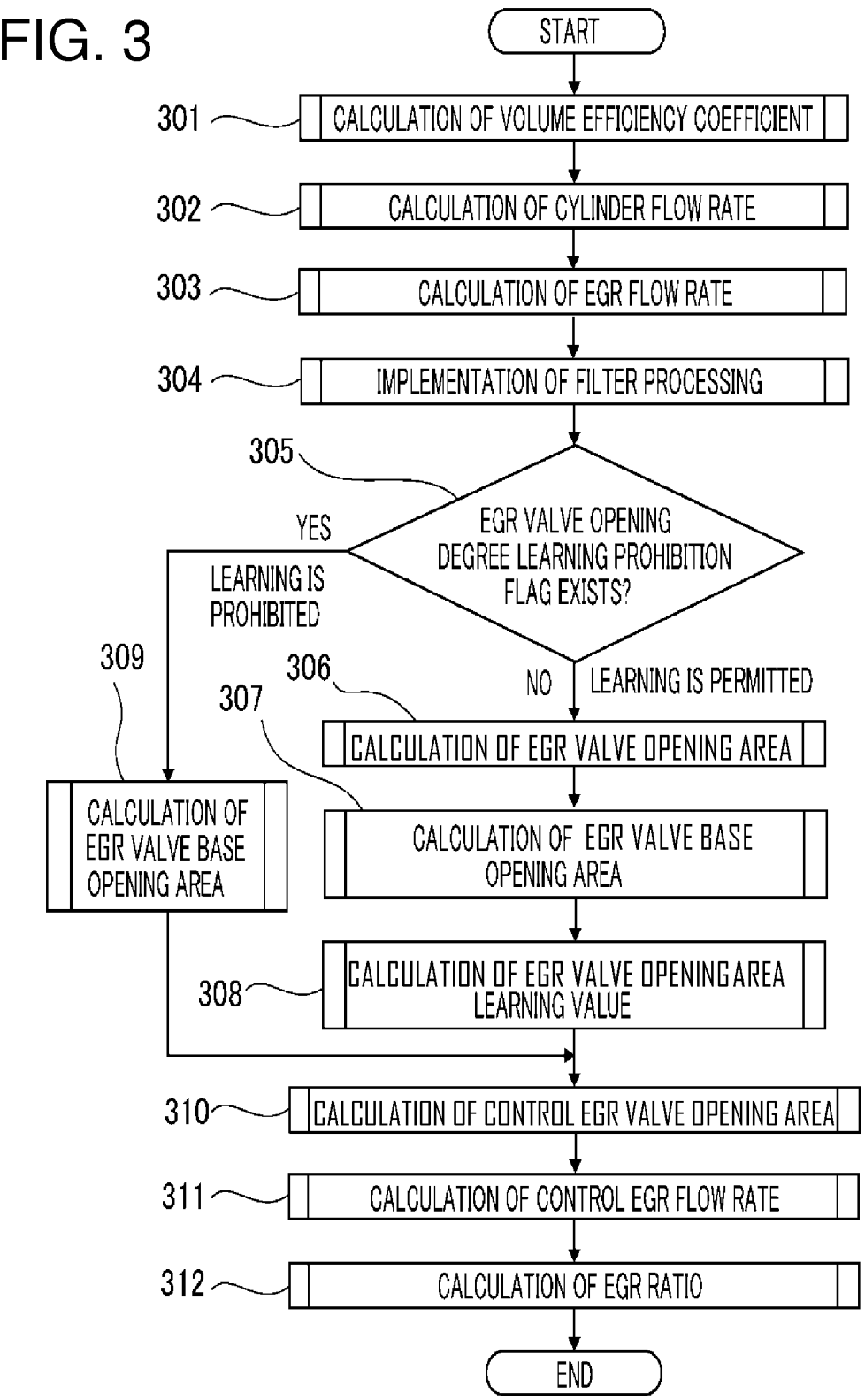
FIG. 3 is a flowchart representing the operation in which learning of an EGR valve opening degree is performed in an internal combustion engine control apparatus according to Embodiment 1 of the present invention.

FIG. 3 is a flowchart representing the operation in which learning of an EGR valve opening degree is performed in an internal combustion engine exhaust gas recirculation amount estimation apparatus according to Embodiment 1 of the present invention; this operation is performed in interrupt processing (for example, BTDC75degCA interrupt processing) in the cycle of a predetermined crank angle. With reference to the flowchart represented in FIG. 3, the process including the processing in the volume efficiency coefficient calculation unit 21 through the processing in the control EGR flow rate calculation unit 29 will be explained in detail.

In FIG. 3, at first, in the step 301, the volume efficiency coefficient calculation unit 21 represented in FIG. 2 calculates the volume efficiency coefficient Kv. This calculation is performed based on the engine rotation speed Ne and the ratio of the atmospheric pressure Pa to the intake manifold pressure Pb obtained, for example, from a map represented in FIG. 4. That is to say, FIG. 4 is a volume efficiency coefficient map in an internal combustion engine exhaust gas recirculation amount estimation apparatus according to Embodiment 1 of the present invention. As can be seen from the map represented in FIG. 4, when the engine rotation speed Ne is 3000 [r/min] and the ratio of the atmospheric pressure Pa to the intake manifold pressure Pb is 0.6, the volume efficiency coefficient Kv is 0.9.

Because the volume efficiency coefficient Kv changes depending on the valve timing, a map corresponding to the change in the variable valve timing is required. When each of the changing ranges of the intake valve and the exhaust valve is from 0 degCA to 50 degCA and a map is prepared every 10 degCA, (6×6) maps are required. In general, there are prepared two maps, i.e., a map corresponding to the desired valve timing depending on the driving condition and a map at a time when the variable valve timing is not being operated. It goes without saying that the volume efficiency coefficient Kv may be obtained not from a map but through calculation.

Next, in the step 302, the cylinder flow rate Qa_all is calculated through the equation (1) below, based on the volume efficiency coefficient Kv and the intake manifold pressure Pb. This calculation is performed by the cylinder flow rate calculation unit 22 represented in FIG. 2.

$$Qa\_all = \frac{Pb \cdot Vc \cdot Kv}{T(n) \cdot R \cdot (Tb+273)} \qquad (1)$$

where Qa_all, Vc, T(n), and R are the cylinder flow rate[g/s], the cylinder volume[L], the every—180° crank angle period[s], and the gas constant[kJ/(kg·K)], respectively.

The cylinder flow rate Qa_all and the volume efficiency coefficient Kv are given by the equation (1); therefore, when the volume efficiency coefficient Kv has been calculated, the cylinder flow rate Qa_all is calculated.

Subsequently, in the step 303, the EGR flow rate calculation unit 23 calculates the EGR flow rate Qae. The EGR flow rate Qae is the difference between the cylinder flow rate Qa_all obtained in the step 302 and the intake air amount Qa. In the step 304, filtering processing, for example, first-order-lag filter processing is applied to the calculated EGR flow rate Qae. This calculation is performed in the EGR flow rate calculation unit 23 represented in FIG. 2.

In many cases, minute measurement noise components intrude in the output of a sensor, such as the intake manifold pressure sensor 7, utilized in the calculation through the equation (1). Accordingly, when the EGR flow rate Qae is calculated based on the cylinder flow rate Qa_all calculated by use of the equation (1), an error may be included in the calculated EGR flow rate Qae. Thus, in the step 304, filtering processing is applied to the EGR flow rate Qae calculated in the step 303 so that the measurement noise components included in the EGR flow rate Qae is reduced. The EGR flow rate Qae, the measurement noise components in which have been reduced, is utilized in the following calculation processing, so that the effect of a minute detection error included in a sensor can be eliminated. The details of the filtering processing will be described later.

In the step 305, it is determined whether or not there exists an EGR valve opening degree learning prohibition flag, described later. This determination in the step 305 is performed in the EGR valve opening area calculation unit 24 represented in FIG. 2. In the case where it is determined in the step 305 that the EGR valve opening degree learning prohibition flag has not been set (NO), the learning of the EGR valve opening degree is permitted and hence the step 305 is followed by the step 306; in the case where it is determined that the EGR valve opening degree learning prohibition flag has been set (YES), the learning of the EGR valve opening degree is prohibited and hence the step 305 is followed by the step 309. The EGR valve opening degree learning prohibition flag is set, for example, when the water temperature condition or the EGR valve opening degree is changing; when neither the water temperature condition nor the EGR valve opening degree is changing, the EGR valve opening degree learning prohibition flag is not set.

In the step 306, the EGR valve opening area Segr is calculated through the equation (2) below, based on the EGR flow rate Qae. This calculation is performed in the EGR valve opening area calculation unit 24 represented in FIG. 2.

$$Segr = \frac{Qae}{\alpha_e \cdot \sigma_e \cdot \rho_e} \quad (2)$$

where Segr, Qae, αe, σe, and ρe are the EGR valve opening area[mm$^2$], the EGR flow rate[g/s], the inner-exhaust-pipe sonic velocity constant[m/s], the dimensionless flow rate constant, and the inner-exhaust-pipe density constant, respectively.

The equation (2) is established between the EGR valve opening area Segr and the EGR flow rate Qae; therefore, when the inner-exhaust-pipe sonic velocity constant αe, the dimensionless flow rate constant σe, and the inner-exhaust-pipe density constant ρe are obtained, the EGR valve opening area Segr is obtained. The inner-exhaust-pipe sonic velocity constant αe[m/s] is defined by the equation (3) below.

$$\alpha_e = \sqrt{\kappa \cdot R \cdot Tex} \quad (3)$$

where κ, R, and Tex are the specific heat ratio (1.4, when the gas is air), the gas constant[kJ/(kg·K)], and the inner-exhaust-pipe temperature, respectively.

The inner-exhaust-pipe temperature Tex may be measured by a temperature sensor provided in the exhaust pipe or may be calculated, for example, from a map including the engine rotation speed Ne and an engine filling efficiency Ec (calculated from the intake air amount). Because the inner-exhaust-pipe sonic velocity constant αe is a function of the exhaust gas temperature, it may be allowed that the calculation through the equation (3) is not performed in the ECU and as a map regarding the temperature, results of preliminarily performed calculation are prepared.

Because being the constant corresponding to a gas, the gas constant R is preliminarily defined. The composition of the gas in the exhaust pipe changes depending on the combustion condition; however, for the sake of simplicity, the gas constant of air may be set; alternatively, it may be allowed that the combustion condition is estimated and the gas constant R is considered to be variable.

The dimensionless flow rate constant σe is defined by the equation (4) below.

$$\sigma_e = \sqrt{\frac{2}{\kappa-1}\left[\left(\frac{Pb}{Pex}\right)^{\frac{2}{\kappa}} - \left(\frac{Pb}{Pex}\right)^{\frac{\kappa+1}{\kappa}}\right]} \quad (4)$$

where κ, Pb, and Pex are the specific heat ratio (1.4, when the gas is air), the intake manifold pressure[kPa], and the inner-exhaust-pipe pressure[kPa], respectively.

The inner-exhaust-pipe pressure Pex may be measured by a pressure sensor provided in the exhaust pipe or may be calculated, for example, from a map including the engine rotation speed Ne and the engine filling efficiency Ec (calculated from the intake air amount). The dimensionless flow rate constant σe is a function of the ratio of the inner-exhaust-pipe pressure Pex to the intake manifold pressure Pb; therefore, it may be allowed that the calculation through the equation (4) is not performed in the ECU and a map created by preliminarily calculating the ratio of the inner-exhaust-pipe pressure Pex to the intake manifold pressure Pb is utilized.

The inner-exhaust-pipe density constant ρe is defined by the equation (5) below.

$$\rho_e = \frac{Pex}{R \cdot Tex} \quad (5)$$

where Pex, R, and Tex are the inner-exhaust-pipe pressure [kPa], the gas constant[kJ/(kg·K)], and the inner-exhaust-pipe temperature, respectively. The inner-exhaust-pipe pressure Pex is obtained as is the case with the equation (4); the inner-exhaust-pipe temperature Tex is obtained as is the case with the equation (3).

In the step 307, the EGR valve base opening area Segr_bse is calculated from the EGR valve opening degree Est. In the step 307, the calculation of the EGR valve base opening area Segr_bse is performed in the EGR valve base opening area calculation unit 25 represented in FIG. 2. FIG.

5 is an EGR valve opening degree vs. opening area map in an internal combustion engine EGR amount estimation apparatus according to Embodiment 1 of the present invention. In the step 307, by use of the preliminarily prepared EGR valve opening degree vs. opening area characteristic map, the EGR valve base opening area Segr_bse is calculated from the EGR valve opening degree Est.

As explained in the equation (2), the opening area and the flow rate are in proportion to each other; therefore, the EGR valve base opening area Segr_bse may be obtained from the EGR valve opening degree vs. flow rate characteristic.

In the step 308, the EGR valve opening area learning value Klrn is calculated based on the EGR valve base opening area Segr_bse and the EGR valve opening area Segr. In other words, the difference between the EGR valve base opening area Segr_bse and the EGR valve opening area Segr is calculated; the calculated difference is the EGR valve opening area learning value Klrn. In the step 308, the calculation of the EGR valve opening area learning value Klrn is performed by the EGR valve opening area learning value calculation unit 26 represented in FIG. 2.

Instead of the difference between the EGR valve base opening area Segr_bse and the EGR valve opening area Segr, another value such as the ratio or the like may be utilized as long as the value distinguish the EGR valve base opening area Segr_bse from the EGR valve opening area Segr. The EGR valve opening area learning value Klrn is stored in a learning region corresponding to the EGR valve opening degree Est, i.e., in the learning value storing unit 27 represented in FIG. 2. The value to be stored may be the EGR valve opening area learning value Klrn itself or a value obtained by multiplying the EGR valve opening area learning value Klrn by a predetermined gain or by adding the predetermined gain to the EGR valve opening area learning value Klrn. FIG. 6 is an EGR valve opening degree vs. learning value map in an internal combustion engine EGR amount estimation apparatus according to Embodiment 1 of the present invention. The contents of the foregoing learning region are, for example, those in the map represented in FIG. 6.

As described above, the EGR valve opening area learning value Klrn is stored in the learning region corresponding to the EGR valve opening degree Est, so that fine learning is made possible; therefore, high-accuracy estimation of the EGR flow rate is made possible even when learning is prohibited. In addition, the calculated value may be utilized as it is, without being stored in the learning region.

In the case where the result of the determination in the step 305 is "YES" and the then the step 305 is followed by the step 307, the EGR valve base opening area Segr_bse is calculated as is the case in the step 307; then, the step 309 is followed by the step 310.

Next, in the step 310, the control EGR valve opening area Segr_ctl to be utilized in control is calculated from the EGR valve opening area learning value Klrn that has been stored and the EGR valve base opening area Segr_bse. In the case where the difference between the EGR valve base opening area Segr_bse and the EGR valve opening area Segr is stored as an EGR valve opening area learning value, the control EGR valve opening area Segr_ctl can be calculated by adding the EGR valve opening area learning value to the EGR valve base opening area. The processing configuration in the step 310 in which the EGR valve opening area learning value is added to the EGR valve base opening area so that the control EGR valve opening area Segr_ctl is calculated corresponds to an opening area correction unit that corrects an EGR valve opening area to be utilized for controlling the internal combustion engine, based on the EGR valve opening area learning value calculated by the EGR valve opening area learning value calculation unit 26. The processing in the step 310 is performed by the control EGR valve opening area calculation unit 28 represented in FIG. 2.

In the step 311, the control EGR flow rate Qae_ctl to be utilized in controlling is calculated from the control EGR valve opening area Segr_ctl. A relationship similar to the equation (2) is established between the control EGR valve opening area Segr_ctl and the control EGR flow rate Qae_ctl; thus, the control EGR flow rate Qae_ctl is obtained. The processing in the step 311 is performed by the control EGR flow rate calculation unit 29 represented in FIG. 2.

In the step 312, the EGR ratio is calculated from the control EGR flow rate Qae_ctl and the intake air amount Qa; then, the processing is ended. The processing in the step 312 is performed by the EGR ratio calculation unit 30 represented in FIG. 2.

As described above, the EGR valve opening area is learned, so that the change over the years of the EGR valve can be dealt with; therefore, there can be demonstrated an advantage that the control EGR flow rate utilized in controlling can accurately be estimated and hence it is not required to utilize the difference between the cylinder flow rate and the flow rate passing through the throttle valve, which is likely to change.

Figure 7:
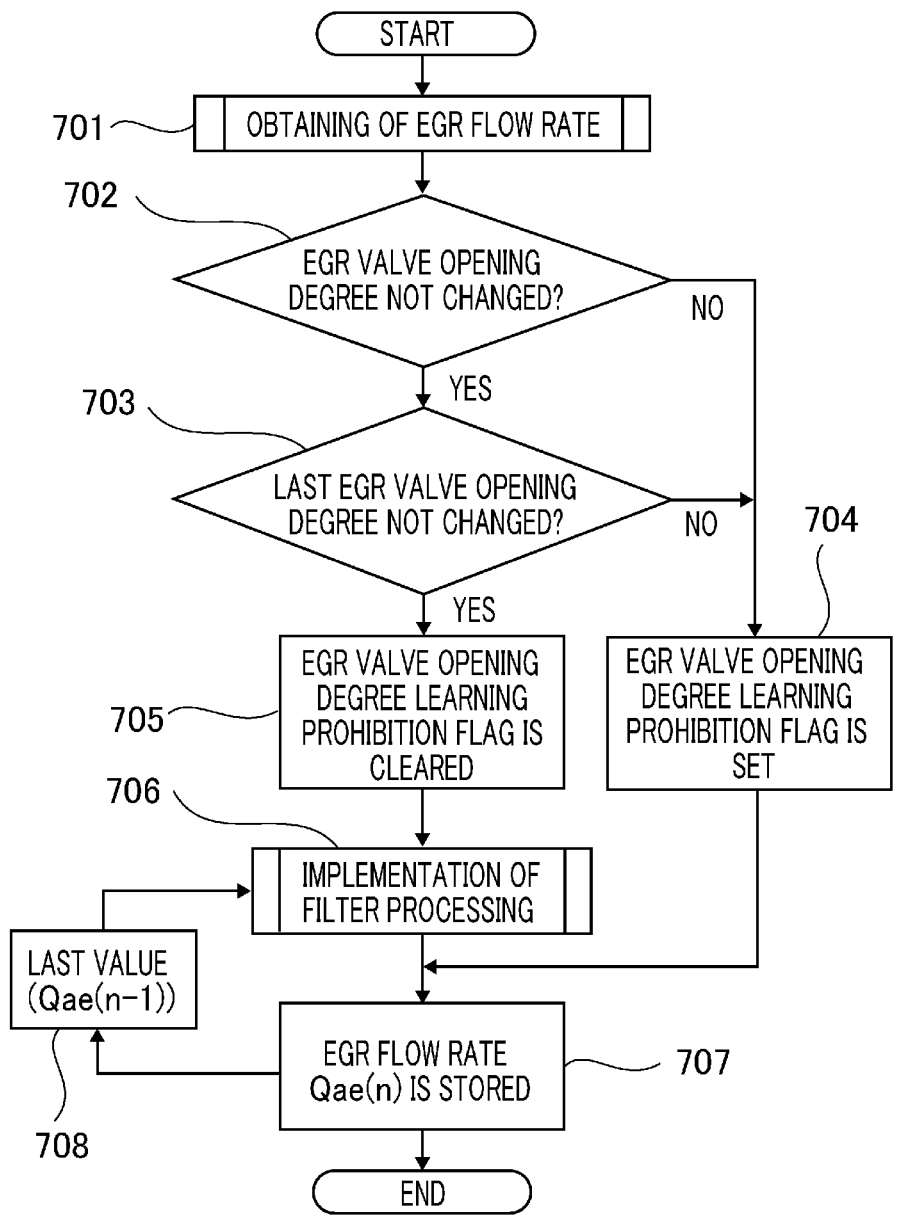
FIG. 7 is a flowchart representing operation in which filtering processing is applied to an EGR flow rate in an internal combustion engine control apparatus according to Embodiment 1 of the present invention.

Next, the filtering processing performed in the step 304 in FIG. 3, i.e., the processing performed by the EGR valve opening area calculation unit 24 in the ECU 20 will be explained in detail. FIG. 7 is a flowchart representing operation in which filtering processing is applied to an EGR flow rate in an internal combustion engine exhaust gas recirculation amount estimation apparatus according to Embodiment 1 of the present invention. In the flowchart in FIG. 7, interrupt processing in the cycle of, for example, a predetermined crank angle, i.e., for example, interrupt processing in the cycle of BTDC75degCA is performed.

In FIG. 7, the EGR flow rate Qae calculated in the step 303 by the EGR flow rate calculation unit 23 in FIG. 3 is obtained in the step 701. Subsequently, in the step 702, it is determined whether or not the EGR valve opening degree has not changed by the same as or more than a predetermined value from the immediately previous value. In the case where it is determined that the EGR valve opening degree has not changed by the same as or more than a predetermined value from the immediately previous value (YES), the step 702 is followed by the step 703; in the case where it is determined that the EGR valve opening degree has changed by the same as or more than a predetermined value from the immediately previous value (NO), the step 702 is followed by the step 704.

In the step 703, it is determined whether or not the immediately previous EGR valve opening degree has not changed by the same as or more than a predetermined value from the twice previous EGR valve opening degree. In the case where it is determined that the immediately previous EGR valve opening degree has not changed by the same as or more than a predetermined value from the twice previous EGR valve opening degree (YES), the step 703 is followed by the step 705; in the case where it is determined that the immediately previous EGR valve opening degree has changed by the same as or more than a predetermined value from the twice previous EGR valve opening degree (NO), the step 703 is followed by the step 704. In the case where the step 703 is followed by the step 704, the EGR valve opening degree learning prohibition flag is set; then, the step 704 is followed by the step 707. In the case where the step 703 is followed by the step 705, the EGR valve opening degree learning prohibition flag is cleared; then, the step 705 is followed by the step 706.

In the step 706, filtering processing according to the equation (6) below is applied to the EGR flow rate Qae obtained by the EGR flow rate calculation unit 23.

$$Qaef(n) = K_1 \cdot Qae(n-1) + (1-K_1) \cdot Qae(n) \quad (6)$$

where Qaef(n), Qae(n), Qae(n−1), and K1 are the filtered EGR flow rate[g/s], the present EGR flow rate[g/s], the immediately previous EGR flow rate[g/s], and the filter coefficient (for example, a value approximately between 0.9 and 0.99 is utilized), respectively.

In order to perform the calculation according to the equation (6), the immediately previous EGR flow rate Qae (n−1) is required. Accordingly, in the step 707, the filtered EGR flow rate Qaef(n), which is the result of the filtering processing, is stored as the present EGR flow rate Qae(n). In the case where it is determined in the step 703 that the EGR valve opening degree has changed by the same as or more than the predetermined value (NO), the EGR valve opening degree learning prohibition flag is set in the step 704 of the flowchart represented in FIG. 7 and the EGR flow rate Qae(n), to which the filtering processing has not been applied, is stored as it is.

In the step 707, the filtered EGR flow rate Qaef(n), which is the result of the filtering processing, is stored as the present EGR flow rate Qae(n); then, the step 707 is followed by the step 708, where the EGR flow rate that has been stored in the step 707 is stored as the immediately previous value Qae(n−1). As a result, it is made possible that in the filtering processing in the step 706, the EGR flow rate Qae(n−1) is obtained from the immediately previous EGR flow rate Qae(n) that has been stored in the step 708 and that the obtained value is utilized as the immediately previous value Qae(n−1) of the EGR flow rate in the present processing. The foregoing filtering processing represented in FIG. 7 can eliminate the effect of a sensor's minute detection error.

Figure 8:
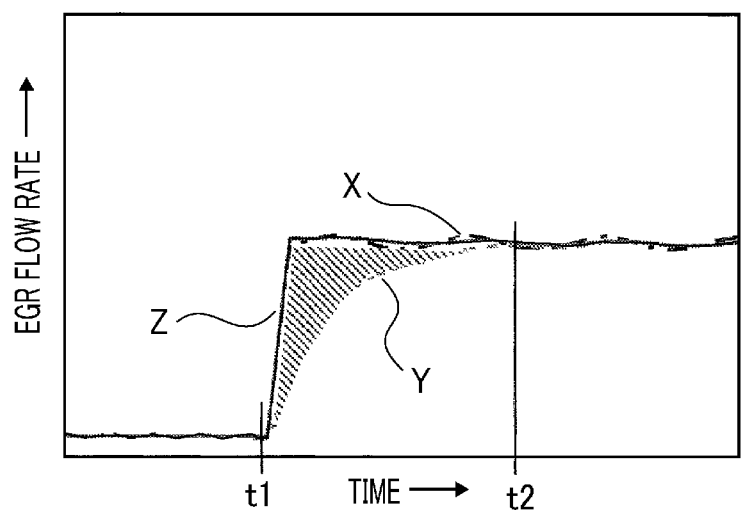
FIG. 8 is a graph representing a case in which filtering processing is applied to an EGR flow rate in an internal combustion engine control apparatus according to Embodiment 1 of the present invention.

FIG. 8 is a graph representing a case in which filtering processing is applied to an EGR flow rate in an internal combustion engine exhaust gas recirculation amount estimation apparatus according to Embodiment 1 of the present invention; the abscissa denotes the time, and the ordinate denotes the EGR flow rate. In FIG. 8, X (a dashed line), Y (a broken line), and Z (a solid line) respectively denote the unfiltered EGR flow rate, the filtered EGR flow rate, and the EGR flow rate at a time when the EGR flow rate utilized in the filtering processing is updated each time the EGR valve opening degree changes. In the case where as represented by Y, the filtering processing is constantly performed, a flow-rate difference, as indicated by the hatched area, from the unfiltered EGR flow rate represented by X occurs in a time between the time instant t1 and the time instant t2.

In an internal combustion engine control apparatus according to Embodiment 1 of the present invention, a change in the EGR valve opening degree is detected, the learning of the EGR valve opening is prohibited while the EGER valve opening degree changes, and the immediately previous EGR flow rate utilized in filtering processing is updated; therefore, the flow rate represented by Z in FIG. 8 is obtained, and hence the flow-rate difference represented by the hatched area can be reduced. As a result, the learning of the EGR valve opening degree can be prevented from being erroneously performed while the EGR valve opening degree changes. As described above, in the case where an internal combustion engine exhaust gas recirculation amount estimation apparatus according to Embodiment 1 of the present invention is utilized, it is made possible to deal with a case where the flow rate suddenly changes as represented in FIG. 8.

As referred to above, the internal combustion engine exhaust gas recirculation amount estimation apparatus according to Embodiment 1 of the present invention makes it possible that even when due to deposits such as soot and the like, the EGR flow rate characteristic changes or even when due to a change over time, the EGR valve does not work, the EGR valve opening degree vs. flow rate characteristic (opening area characteristic) can be learned; therefore, the result of the learning makes it possible to accurately estimate the EGR flow rate, and hence the control amounts can be set in accordance with the estimated EGR flow rate.

Various modifications and alterations of this invention will be apparent to those skilled in the art without departing from the scope and spirit of this invention, and it should be understood that this is not limited to the illustrative embodiments set forth herein.

What is claimed is:
1. An internal combustion engine control apparatus comprising:
 an intake air amount detection unit that detects an amount of air that passes through a throttle valve provided in an intake pipe of an internal combustion engine and is taken into the internal combustion engine;
 an exhaust gas recirculation (EGR) path that connects the intake pipe at a downstream side of the throttle valve with an exhaust pipe of the internal combustion engine;
 an EGR valve that opens or closes the EGR path to control a recirculation amount of exhaust gas that passes through the EGR path;
 an intake pipe pressure detection unit that detects a pressure in the intake pipe at the downstream side of the throttle valve;
 a volume efficiency corresponding value calculation unit that is configured to calculate a volume efficiency corresponding value as an index that indicates an amount of air that flows from the intake pipe at the downstream side of the throttle valve into a cylinder of the internal combustion engine;
 a cylinder flow rate calculation unit that is configured to calculate a cylinder flow rate as an amount of air that flows from the intake pipe at the downstream side of the throttle valve into the cylinder, based on the pressure in the intake pipe and the volume efficiency corresponding value;
 an EGR amount calculation unit that is configured to calculate the recirculation amount of exhaust gas, based on an intake air amount detected by the intake air amount detection unit and the cylinder flow rate;
 an EGR valve opening degree sensor that senses an opening degree of the EGR valve and provides a detection result;
 an EGR valve opening area calculation unit that is configured to calculate an EGR valve opening area corresponding to the opening degree of the EGR valve, based on the recirculation amount of exhaust gas and the detection result of the EGR valve opening degree sensor;
 an EGR valve base opening area calculation unit that is configured to determine an EGR valve base opening area corresponding to the opening degree of the EGR valve, based on pre-stored EGR valve opening area values, which have been calculated and stored in advance in correspondence to various opening degrees of the EGR valve;

an EGR valve opening area learning value calculation unit that is configured to calculate an EGR valve opening area learning value as a difference between the calculated EGR valve opening area and the determined EGR valve base opening area, based on the detection result of the EGR valve opening degree sensor;

an opening area correction unit that is configured to correct a control EGR valve opening area used in controlling the internal combustion engine based on the EGR valve opening area learning value; and a control EGR flow rate calculation unit that is configured to calculate the recirculation amount of exhaust gas utilized in controlling the internal combustion engine, based on the corrected control EGR valve opening area.

2. The internal combustion engine control apparatus according to claim 1, further including:

an intake pipe side pressure detection unit that is configured to detect an intake pipe side pressure in the EGR path;

an exhaust pipe side temperature detection unit that is configured to detect an exhaust pipe side temperature in the EGR path;

an exhaust pipe side pressure detection unit that is configured to detect an exhaust pipe side pressure in the EGR path;

an exhaust pipe side sonic velocity calculation unit that is configured to calculate an exhaust pipe side sonic velocity, based on the exhaust pipe side temperature detected by the exhaust pipe side temperature detection unit; and an exhaust pipe side density calculation unit that is configured to calculate an exhaust pipe side density, based on the exhaust pipe side pressure detected by the exhaust pipe side pressure detection unit and the exhaust pipe side temperature detected by the exhaust pipe side temperature detection unit, wherein the EGR valve opening area calculation unit is configured to calculate the EGR valve opening area, based on the opening degree of the EGR valve, the intake pipe side pressure detected by the intake pipe side pressure detection unit, the exhaust pipe side pressure detected by the exhaust pipe side pressure detection unit, the exhaust pipe side sonic velocity calculated by the exhaust pipe side sonic velocity calculation unit, the exhaust pipe side density calculated by the exhaust pipe side density calculation unit, and the recirculation amount of exhaust gas calculated by the EGR amount calculation unit.

3. The internal combustion engine control apparatus according to claim 2, wherein the EGR valve base opening area calculation unit is configured to determine the EGR valve base opening area corresponding to the opening degree of the EGR valve, based on a map indicating a relationship between the pre-stored EGR valve base opening area values and the various opening degrees of the EGR valve.

4. The internal combustion engine control apparatus according to claim 1, wherein filtering processing is applied to the recirculation amount of exhaust gas calculated by the EGR amount calculation unit.

5. The internal combustion engine control apparatus according to claim 4, wherein in the case where the opening degree of the EGR valve is changing, the filtering processing is performed in such a way that, as an initial value, there is utilized the recirculation amount of exhaust gas calculated by the EGR amount calculation unit after the change of the opening degree of the EGR valve has finished.

6. The internal combustion engine control apparatus according to claim 3, further including a learning value storing unit that is configured to store the EGR valve opening area learning value in accordance with the opening degree of the EGR valve, as a map providing a correspondence between the opening degree of the EGR valve and the EGR valve opening area learning value.

7. The internal combustion engine control apparatus according to claim 1, wherein the calculated EGR valve opening area is directly proportional to the calculated recirculation amount of exhaust gas.

8. The internal combustion engine control apparatus according to claim 1, wherein the recirculation amount of exhaust gas is related to a difference between the detected intake air amount and the calculated cylinder flow rate.

9. The internal combustion engine control apparatus according to claim 1, wherein a relationship between the EGR valve opening area values and the various opening degrees of the EGR valve is stored in a memory as a map.

10. The internal combustion engine control apparatus according to claim 9, wherein the EGR valve base opening area calculation unit is configured to determine the EGR valve base opening area corresponding to the sensed opening degree of the EGR valve by referring to the map.

11. The internal combustion engine control apparatus according to claim 10, wherein the opening area correction unit is configured to correct the control EGR valve opening area by adding the EGR valve opening area learning value to a value of the EGR valve base opening area determined from the map.

* * * * *